US006515048B1

(12) United States Patent
Kalbe et al.

(10) Patent No.: US 6,515,048 B1
(45) Date of Patent: Feb. 4, 2003

(54) ADHESIVE POWDER

(75) Inventors: Michael Kalbe, Essen (DE); Silke Wagener, Landau (DE); Peter S. Grynaeus, Birkenau-Niederliebersbach (DE)

(73) Assignee: Firma Carl Freudenberg, Weinheim (DE)

( * ) Notice: Subject to any disclaimer, the term of this patent is extended or adjusted under 35 U.S.C. 154(b) by 0 days.

(21) Appl. No.: 09/857,562

(22) PCT Filed: Nov. 25, 1999

(86) PCT No.: PCT/EP99/09098

§ 371 (c)(1),
(2), (4) Date: Jun. 6, 2001

(87) PCT Pub. No.: WO00/34406

PCT Pub. Date: Jun. 15, 2000

(30) Foreign Application Priority Data

Dec. 7, 1998 (DE) .......................................... 198 56 254

(51) Int. Cl.⁷ ............................ C08K 5/01; C08L 63/02
(52) U.S. Cl. ........................ 523/465; 525/113; 525/118; 525/120; 525/430; 525/449; 525/528
(58) Field of Search .......................... 523/465; 525/107, 525/113, 117, 118, 119, 120, 423, 430, 438, 449, 454, 528

(56) References Cited

U.S. PATENT DOCUMENTS

| 4,113,684 A | 9/1978 | Petrie |
| 4,117,038 A | 9/1978 | Lehmann et al. |
| 4,122,128 A | * 10/1978 | Lehmann |
| 4,517,340 A | 5/1985 | Read et al. |

FOREIGN PATENT DOCUMENTS

| EP | 0 289 632 | 11/1988 |
| FR | 2 376 891 | 8/1978 |

OTHER PUBLICATIONS

"Thermoplastic," "Resins," and "Epoxy Resins." Quelle: CD Römpp Lexikon—Version 1.0, Stuttgart/New York: George Thieme Verlag 1995, pp. 1–4.

* cited by examiner

Primary Examiner—Robert Dawson
Assistant Examiner—D. Aylward
(74) Attorney, Agent, or Firm—Kenyon & Kenyon

(57) ABSTRACT

An adhesive powder for bonding flat, closed, or porous substrates, the adhesive powder being applied in the first step to a first substrate, an intermediate product that is non-adhesive at room temperature and stable in storage being produced, and the first substrate being bonded to a second substrate in a second step by applying an increased temperature and pressure, as a combination of the following components: i) a thermoplastic polymer having a proportion of 25 to 95% by weight; and ii) at least one epoxy resin that is solid at room temperature and has a proportion of 5 to 75% by weight; and, if desired, iii) at least one pre-adduct of epoxy resins and polyamines that is solid at room temperature and has a proportion of at most 25% by weight, a physical bonding taking place when the adhesive powder is applied to the first substrate in the first step, and the two substrates being bonded in the second step by the powder components being chemically cross-linked or post-cross-linked among one another, and being subsequently cooled.

27 Claims, No Drawings

ADHESIVE POWDER

BACKGROUND OF THE INVENTION

1. Background Information

The present invention relates to the manufacture of an adhesive powder for joining flat, closed, or porous substrates, the adhesive powder being applied in a first step to a first substrate, an intermediate product that is non-adhesive at room temperature and stable in storage being produced, and the first substrate being joined in a second step to a second substrate by applying an increased temperature and pressure.

2. Background Information

Adhesive powders on the basis of thermoplastics that can be applied to the substrate to be bonded and result in a non-adhesive intermediate product that is stable in storage are commonly known. The bonding to a second substrate is the result of applying heat under pressure, and the adhesive layer hardens in a purely physical manner through cooling. In the case of these melt-sealing adhesives or heat-sealing adhesives, it is disadvantageous that the temperature resistance of the produced bonds is limited by the melting range of the thermoplastics used. For some bonds, the hydrolytic stability and the solvent stability of the bonds is reduced by the low-set melting point of the copolymers and the low crystallinity associated therewith.

Considerably better characteristics with respect to bonding strength, hydrolytic stability, and solvent stability can be achieved by using epoxide-based adhesives. However, these then have the disadvantage that they are not suitable for elastic bonds, which are subjected to bending loads. As two-component systems, they also have the disadvantage that they must always be mixed and subsequently applied in liquid or paste-like form shortly before to the bonding process. Therefore, there it is not possible to store or ship the materials coated with the adhesive. As a single-component system, they usually have to be stored at low temperatures to maintain their usability or are first cross-linked at temperatures above 150° C. In this context, the reaction times are partially very long, thereby significantly thermally stressing the substrates to be joined.

SUMMARY OF THE INVENTION

The object of the present invention is to create an adhesive powder that can be applied to a first substrate, forms a firm bond to the substrate at room temperature, and is stable in storage. This intermediate product, which is non-adhesive at room temperature and is stable in storage, is to be bonded to a second substrate in a temperature range that is a low as possible and at low pressures. Therefore, the reaction time should be as short as possible.

In the case of an adhesive powder according to the species defined at the outset, the object is achieved according to the present invention by combining the following components. The powder is made of a thermoplastic polymer with a proportion of 25–95% by weight and at least one epoxy resin, which is solid at room temperature, with a proportion of 5–75% by weight, and, if desired, at least one pre-adduct of epoxy resins and polyamines, which is also solid at room temperature, with a proportion of at most 25% by weight. When applying the adhesive powder to the first substrate in a first step, the adhesive powder is bound in a predominantly physical manner to the substrate, while the two substrates are joined in a second step by chemically cross-linking or post-cross-linking the powder components among each other and subsequently cooling them. Thus, the mixture of the selected compounds enables the manufacture of a non-adhesive substrate that is stable in storage and has an adhesive layer that, applied to the substrate, first and foremost bonds to the substrate in a physical manner. After the cooling process, the adhesive layer is latently reactive. During the process of laminating a second substrate at a higher temperature than in the process of coating the first substrate, the adhesive layer is activated, and cross-linking occurs. Surprisingly, it turned out that the manufactured product has improved temperature resistance, hydrolytic stability, as well as solvent stability in comparison with purely thermoplastic adhesives, and moreover, also has improved elasticity with respect to products having epoxide-based adhesives. The reason for this is that the polymer is cross-linked with the epoxy resin. It was also surprising that the cross-linking of the components already begins at significantly lower temperatures. Depending on the composition of the adhesive powder, cross-linking was already able to be achieved starting at 90° C. Cross-linking also occurred with extremely short reaction times.

The proportion of the thermoplastic polymer can have a wide range, however, a proportion of 50 to 90% by weight is preferred. The amount of epoxy resin is significantly smaller. It is preferably between 10 and 50% by weight. In the case that a pre-adduct is used, its proportion is at most 25% by weight.

Suitable thermoplastic polymers are low-melting polyamides, polyesters, polyurethanes, and/or vinyl copolymers having the functional side groups carboxyl-, amino-, amido-, and anhydro-. It is also possible that the thermoplastic polymer is a polymer blend of low-melting polyamides, polyesters, polyurethanes, and/or vinyl copolymers having the functional side groups carboxyl-, amino-, amido-, anhydro-. In this context, the polymers are made up of linear or branched monomers. The polyamide can be constituted of one or more of the following monomers:

at least one at least difunctional carboxylic acid;

at least one at least difunctional amine;

at least one ω-amino carboxylic acid at least one lactam.

The polyester is produced from one or more of the following monomers:

at least one at least difunctional carboxylic acid;

at least one at least difunctional alcohol;

at least one ω-hydroxycarboxylic acid;

at least one lactone.

The polyurethanes can be composed of diisocyanates, polyols, and diols.

Epoxy resins that are solid at room temperature preferably have reaction products of epichlorohydrine with bisphenol A and/or reaction products of epichlorohydrine with bisphenol F. It is also possible that the epoxy resin has polyfunctional epoxides. Epoxidized novolaks, for example, also come under this.

The pre-adduct of epoxy resins and polyamines, which is also solid at room temperature, is made of reaction products of epoxy resins based on bisphenol A and polyamine and/or reaction products of epoxy resins based on bisphenol F and polyamine. A pre-adduct of epoxy resins and polyaminoamides of polyamines and dimerous fatty acids is also possible.

Depending on the purpose of application and type of substrate, it is possible in further embodiments of the inventive idea that the adhesive powder is mixed with additional additives. In this context, low-melting resins and/or waxes having melting points of under 100°, preferably under 90° C., and/or dyes, and/or mineral fillers, and/or organic fillers are possible as additives. The proportion of these additives should not exceed 10% by weight in total. The use of low-melting resins and/or waxes is above all a possibility when the first substrate is coated at the lowest possible temperatures. Dyes influence the coloring. Metallic fillers influence the thermal conductivity. Their parts by weight can be higher.

Apart from the special feature of the low-melting resins or waxes, it is important that the thermoplastic polymer or the epoxy resin has a first melting point that is different from that of the two other components, the melting point being under 130° C., preferably under 100° C., and having a softening point between 50 and 90° C. As a result, it is ensured that during the process of coating a first substrate, a bond to the substrate is only created by the surface of the thermoplastic polymer or of the epoxy resin being melted, while in the case of the other component(s), there is still no melting. The is result is that the melting point of the other component or components is higher than the first melting point of the thermoplastic polymer or epoxy resin. However, it turned out that the second melting point of the other component or components must only be slightly above the first melting point to produce good results. Therefore, epoxy resins are used whose melting points are under 130° C., preferably under 100° C. This contributes significantly to the energy demand for bonding the two substrates being kept as small as possible.

The coating temperature at which the powder is applied to the substrate is typically 5 to 10° C. above the melting point of the component having the lowest melting point. As already indicated above, it is also possible that, at the first increased temperature, the adhesive powder is fixed to the first substrate by melting the additives. In this context, the adhesive layer is bonded to the first substrate in a purely physical manner. The chemical cross-linking is first initialized in response to the two substrates being joined together at a second increased temperature, e.g. by hot-pressing. The main components are also cross-linked with one another in this procedure, so that a product having high stability and flexibility is achieved.

It should be noted that different application techniques are available for applying the adhesive powder to the substrate (s).

For example, bonding using a high-frequency field as a heat source is also possible for laminating, particularly when there are metallic fillers in the adhesive powder.

To achieve an adhesive layer that is as uniform as possible on the substrate, the particle size of the adhesive powder is selected to be less than 200 µm, preferably less than 100 µm.

In pursuance of the inventive idea, it is also possible that the second substrate is also provided with the adhesive powder in a first step. If needed, this can support the bonding process during lamination.

DETAILED DESCRIPTION

EXAMPLE 1

A powder mixture made of a thermoplastic made of a polyamide, an epoxy resin, a polyamine-epoxide pre-adduct, a wax, and an amorphous silicon dioxide is produced in a mixing vat. In the sequence above, the parts by weight are 64.6%; 27.6%; 5.3%; 2.0%; 0.5%. A product having the trade name platamid H 103PA80 is selected as the polyamide, and a product having the name epikote 1002 is selected as the epoxy resin. The individual components are ground to a particle size of less than 100 µm prior to being mechanically mixed. The thus-produced mixture is mixed according to conventional methods with water and a paste base of dispersants, thinning agents, and thickeners to form a paste and is applied to one side of a nonwoven fabric in a coating process. Subsequently, a dry temperature of 95° C. is used. The nonwoven fabric provided with the adhesive powder exhibits good storage stability. The nonwoven webs of fabric rolled up into rolls do not stick together. The adhesive powder adheres firmly to the surface of the nonwoven fabric.

The thus-produced nonwoven fabric is placed on a woolen fabric, and together they are passed through a continuous press while applying pressure and heat. The press temperature is 120° C. at a press pressure of 3 bar and with a period of dwell of 30 seconds. The laminate produced in this manner is extremely resistant in the sense of the problem definition.

EXAMPLE 2

A powder produced in the same manner and having a polyamide proportion of 62.5% by weight, an epoxide proportion of 32.5% by weight (epikote 1055), and 4% by weight of a wax is processed with 1% by weight of silicon dioxide as a processing agent and water as well as a paste base to form a paste. The paste is applied at room temperature to a nonwoven fabric and dried at 105° C. in the continuous-heating furnace. The nonwoven fabric had good storage stability. The laminating process was carried out at a press temperature on 130° C. The produced laminate exhibits high temperature stability and solvent stability.

What is claimed is:
1. An adhesive powder for bonding flat, closed, or porous substrates, comprising:
   i) a thermoplastic polymer component in a proportion of 25 to 95% by weight; and
   ii) at least one epoxy resin component that is solid at room temperature in a proportion of 5 to 75% by weight; wherein the adhesive powder is capable of being applied in a first step to a first substrate so as to be physically bonded to the first substrate and thereby produce an intermediate product that is non-adhesive at room temperature and stable in storage, and wherein the first substrate is capable of being bonded to a second substrate in a second step by applying an increased temperature and pressure, the two substrates being bonded in the second step by the powder components being chemically cross-linked or post-cross-linked among one another, and being subsequently cooled.

2. The adhesive powder according to claim 1, further comprising:
   iii) at least one pre-adduct of an epoxy resin and a polyamine that is solid at room temperature in a proportion of up to 25% by weight.

3. The adhesive powder according to claim 1, wherein the proportion of the thermoplastic polymer is 50 to 90% by weight, and the proportion of epoxy resin is 10 to 50% by weight.

4. The adhesive powder according to claim 1, wherein the thermoplastic polymer is a low-melting polyamide, polyester, polyurethane, or vinyl copolymer having carboxyl-, amino-, amido-, or anhydro-functional side groups.

5. The adhesive powder according to claim 1, wherein the thermoplastic polymer is a polymer blend of at least one of low-melting polyamides, polyesters, polyurethanes, or vinyl copolymers having carboxyl-, amino-, amido-, or anhydro-functional side groups.

6. The adhesive powder according to claim 1, wherein the polymer component of the powder is made up of linear or branched monomers.

7. The adhesive powder according to claim 1, wherein the polymer component includes a polyamide which is formed from at least one of the following monomers:

at least one at least difunctional carboxylic acid;

at least one at least difunctional amine;

at least one ω-amino carboxylic acid;

at least one lactam.

8. The adhesive powder according to claim 1, wherein the polymer component includes a polyester which is formed from at least one of the following monomers:

at least one at least difunctional carboxylic acid;

at least one at least difunctional alcohol;

at least one ω-hydroxycarboxylic acid;

at least one lactone.

9. The adhesive powder according to claim 1, wherein the polymer component includes a polyurethane which is made up of diisocyanates, polyols, and diols.

10. The adhesive powder according to claim 1, wherein the epoxy resin that is solid at room temperature has a reaction product of epichlorohydrine with bisphenol A, or a reaction product of epichlorohydrine with bisphenol F, or a reaction product of epichlorohydrine with novolak.

11. The adhesive powder according to claim 1, wherein the epoxy resin that is solid at room temperature has polyfunctional epoxides.

12. The adhesive powder according to claim 2, wherein the pre-adduct of epoxy resins and polyamines that is solid at room temperature has a reaction product of an epoxy resin based on bisphenol A and a polyamine, or a reaction product of an epoxide resin based on bisphenol F and a polyamine.

13. The adhesive powder according to claim 2, wherein the pre-adduct that is solid at room temperature is made of epoxy resins and polyaminoamides including polyamines and dimerous fatty acids.

14. The adhesive powder according to claim 1, wherein the adhesive powder is mixed with at least one additional additive.

15. The adhesive powder according to claim 14, wherein the additional additive is a low-melting resin or wax having a melting point under 100° C., a dye, a mineral filler, or an organic filler.

16. The adhesive powder according to claim 15, wherein the additional additives are present in a proportion up to 10% by weight.

17. The adhesive powder according to claim 14, wherein the at least one additional additive is a metallic filler.

18. The adhesive powder according to claim 1, wherein the thermoplastic polymer or the epoxy resin has a first melting point that is different from that of the other components of the powder and is under 130° C., and has a softening point between 50 and 90° C.

19. The adhesive powder according to claim 1, wherein the thermoplastic polymer or the epoxy resin has a first melting point that is different from that of the other components of the powder and is under 100° C., and has a softening point between 50 and 90° C.

20. The adhesive powder according to claim 18, wherein said other components of the powder has a higher, second melting point under 130° C.

21. The adhesive powder according to claim 18, wherein said other components of the powder has a higher, second melting point under 100° C.

22. The adhesive powder according to claim 14, wherein the adhesive powder is fixed to the first substrate at the first increased temperature by melting the additives.

23. The adhesive powder according to claim 1, wherein chemical cross-linking is initiated at a second temperature during bonding to the second substrate by hot-pressing.

24. The adhesive powder according to claim 1, wherein the particle size of the adhesive powder is less than 200 μm.

25. The adhesive powder according to claim 1, wherein the particle size of the adhesive powder is less than 100 μm.

26. The adhesive powder according to claim 1, wherein the second substrate is also provided with the adhesive powder in a first step.

27. The adhesive powder according to claim 1, wherein the powder is capable of being heated in a high-frequency field.

* * * * *

UNITED STATES PATENT AND TRADEMARK OFFICE
CERTIFICATE OF CORRECTION

PATENT NO.   : 6,515,048 B1  
DATED        : February 4, 2003  
INVENTOR(S)  : Michael Kalbe et al.

Page 1 of 1

It is certified that error appears in the above-identified patent and that said Letters Patent is hereby corrected as shown below:

<u>Column 1,</u>  
Line 5, please delete "1. Background Information" and insert -- Field of the Invention --;  
Line 15, please delete "2.";

<u>Column 2,</u>  
Line 23, please insert -- DETAILED DESCRIPTION OF THE INVENTION --;

<u>Column 3,</u>  
Line 22, please change "The is result" to -- The result --;  
Line 59, please delete "DETAILED DESCRIPTION".

Signed and Sealed this

Twenty-fifth Day of May, 2004

JON W. DUDAS  
*Acting Director of the United States Patent and Trademark Office*